US008129438B2

(12) United States Patent
Nohara et al.

(10) Patent No.: US 8,129,438 B2
(45) Date of Patent: Mar. 6, 2012

(54) METHOD FOR PRODUCING FOAMED POLYOLEFIN RESIN BEADS

(75) Inventors: Tokunobu Nohara, Yokkaichi (JP); Mitsuru Shinohara, Yokkaichi (JP); Masaharu Oikawa, Yokkaichi (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 13/064,018

(22) Filed: Mar. 2, 2011

(65) Prior Publication Data

US 2011/0147974 A1 Jun. 23, 2011

Related U.S. Application Data

(63) Continuation of application No. 12/292,925, filed on Dec. 1, 2008, now abandoned.

(30) Foreign Application Priority Data

Dec. 27, 2007 (JP) ................................. 2007-336856

(51) Int. Cl.
*C08J 9/22* (2006.01)

(52) U.S. Cl. .............. 521/56; 521/57; 521/58; 428/407; 428/403; 428/404; 428/405; 428/406; 427/212; 427/412.3

(58) Field of Classification Search .......... 428/403–407; 521/58, 56, 57; 427/212, 412.3
See application file for complete search history.

(56) References Cited

U.S. PATENT DOCUMENTS

| | | | |
|---|---|---|---|
| 3,953,558 A | 4/1976 | Hatano et al. | |
| 6,797,734 B2 * | 9/2004 | Iwamoto et al. | 521/58 |
| 2004/0054042 A1 * | 3/2004 | Iwamoto et al. | 524/100 |

FOREIGN PATENT DOCUMENTS

| | | | |
|---|---|---|---|
| EP | 0 224 265 B1 | | 1/1992 |
| JP | B-41-16125 | | 9/1966 |
| JP | B-43-23858 | | 10/1968 |
| JP | B-44-29522 | | 12/1969 |
| JP | B-46-38359 | | 11/1971 |
| JP | B-51-22951 | | 7/1976 |
| JP | B-60-185816 | | 9/1985 |
| JP | B2-62-34336 | | 7/1987 |
| JP | A-03-103466 | | 4/1991 |
| JP | B2-4-46217 | | 7/1992 |
| JP | B2-6-22919 | | 3/1994 |
| JP | B2-6-49795 | | 6/1994 |
| JP | A-10-077359 | | 3/1998 |
| JP | A-2000-090421 | | 10/2000 |
| JP | A-2001-278985 | | 10/2001 |
| JP | 2002003634 | * | 1/2002 |
| JP | A-2002-3634 | | 1/2002 |
| JP | A-2002-003634 | | 1/2002 |
| WO | WO03/078127 | * | 9/2003 |
| WO | WO 03/078127 A1 | | 9/2003 |

OTHER PUBLICATIONS

European Search Report issued in Application No. EP 08 02 1574, mailed on Oct. 28, 2009.

* cited by examiner

*Primary Examiner* — Leszek Kiliman

(74) *Attorney, Agent, or Firm* — Oliff & Berridge, PLC

(57) ABSTRACT

Foamed polyolefin resin beads having antistatic properties obtained by a process, which includes dispersing polyolefin resin beads into an aqueous medium, injecting a blowing agent, stirring and allowing the polyolefin resin beads to foam and expand. The polyolefin resin beads are composite resin beads comprising a core layer of a core layer polyolefin resin and a covering layer of a covering layer polyolefin resin.

14 Claims, 2 Drawing Sheets

METHOD FOR PRODUCING FOAMED POLYOLEFIN RESIN BEADS

This is a Continuation of application Ser. No. 12/292,925 filed Dec. 1, 2008, which claims priority of Japanese Application No. 2007-336856 filed Dec. 27, 2007. The disclosure of the prior application is hereby incorporated by reference herein in its entirety.

BACKGROUND

1. Field of the Invention

The present invention relates to foamed polyolefin resin beads which are excellent in fusion properties between beads at the time of molding in a mold, capable of providing a molded foamed article which is excellent antistatic performance, has no deterioration of the antistatic performance with elapse of the time, whose antistatic performance is not humidity dependent, does not contaminate packaging products, has a good molded foamed article surface, and has excellent mechanical properties. The present invention provides foamed polyolefin resin beads and a molded article obtained by molding the beads in a mold which are used as shock absorbing materials, heat insulating materials, or packaging materials in the electronic or automotive industry or useful for application to returnable boxes.

2. Description of the Related Art

Foamed polyolefin resin beads and a molded foamed article produced by molding the foamed polyolefin resin beads in a mold have been widely used for packaging of electronic devices such as OA instruments and parts or precision instruments and parts and further used as cushioning packaging materials. Polyolefin resin is easily charged, which causes adhesion of dust and damage to equipment parts. Therefore, a molded foamed article composed of foamed polyolefin resin beads to which antistatic performance is given has been used.

Examples of the method for imparting the antistatic performance to the foamed polyolefin resin beads include a method for applying a surfactant to the surface of the molded article and a method for molding foamed beads in which a polyolefin resin into which the surfactant is kneaded is foamed. A molded article composed of foamed beads in which the polyolefin resin into which the surfactant is kneaded has been used as a suitable material with antistatic performance. However, when the antistatic performance is achieved by the surfactant, the surfactant present on the surface of the molded article surface adsorbs moisture in the air. Therefore, it is difficult to produce the antistatic effect under an environment of low humidity, particularly in winter. Additionally, there have been problems of contamination due to the adhesion of the surfactant to packaging products and decrease in performance with age.

In the method for applying the surfactant to the surface of the molded article, the surfactant is easily flaked off from the surface of the molded article and the antistatic effect cannot be produced after the separation.

As a method for solving the problems of the adhesion of the surfactant to packaging products, contamination of packaging products, and flaking of the surfactant when the surfactant are used, foamed polyolefin resin beads containing a hydrophilic polymer and the surfactant and the molded foamed article obtained by molding the foamed polyolefin resin beads in a mold are disclosed in Japanese Patent Application Laid-Open (JP-A) No. 2000-290421. The invention described in JP-A No. 2000-290421 is that the surfactant is trapped between molecules of the hydrophilic polymer, thereby preventing the surfactant from transferring to packaging products.

Alternatively, foamed resin beads are produced by foaming and expanding resin particles to which polymer type antistatic agent containing the hydrophilic polymer as an antistatic agent is added, thereby preventing the surfactant from transferring to packaging products and antistatic performance from being reduced, which is well known.

A technique which gives antistatic performance by coating the surface of foamed polyolefin resin beads with an adhesive resin containing the polymer type antistatic agent is disclosed in JP-A No. 2002-3634.

Japanese Patent Application Publication (JP-B) No. 62-34336 and JP-A No. 10-77359 are disclosed foaming and expanding foamed resin beads composed of a core layer including the polyolefin resin and a covering layer prepared from the polyolefin resin having a melting point lower than that of the polyolefin resin in the core layer in order to improve fusion bonding properties between the foamed resin beads.

Although a method described in JP-A No. 2000-290421 prevents the surfactant from transferring (transcription) to packaging products, fusion bonding properties of foamed resin beads are reduced when the hydrophilic polymer is added to the foamed resin beads. Further, since the hydrophilic polymer has water absorption properties, when resin particles are heated in an aqueous medium under pressure, resin particles absorb water. When the expansion ratio is high, the pressure in the cells of the obtained foamed resin beads is reduced by water condensation, which causes the phenomenon of shrinkage of beads in themselves.

In order to achieve a high antistatic performance by the polymer type antistatic agent, it is necessary to add a large amount of the antistatic agent to the foamed resin beads. However, when the additive amount of the polymer type antistatic agent containing the hydrophilic polymer (hereinafter simply referred to as "polymer type antistatic agent" or "antistatic agent") is increased to obtain a high antistatic performance, the foaming properties of foamed resin beads are inhibited and the fusion bonding properties between the foamed resin beads are reduced with the increase in the additive amount. When the heating temperature at the time of molding is increased to improve the fusion bonding properties between the foamed resin beads, the foamed resin beads cannot resist the heating temperature. As a result, the foamed resin beads are shrunk or fused to not only the surface of them but also the inside of them, thereby causing serious damage to the cell structure of the obtained molded foamed article. On the other hand, when the heating temperature is lowered, fusion bonding properties of foamed resin beads are reduced and the surface condition of the molded foamed article is significantly deteriorated. Thus, a good molded foamed article cannot be obtained. Particularly, the phenomenon is significantly observed in foamed resin beads having a high expansion ratio.

A method described in JP-A No. 2002-3634 involves a process of kneading the polymer type antistatic agent with the adhesive resin and coating the surface of foamed resin beads with the adhesive resin containing the polymer type antistatic agent and thus the production step is complicated. When the adhesive resin is used, foamed resin beads are easily adhered each other in the coating step. Further, the charging property of the foamed resin beads to a molding cavity may be unstable.

SUMMARY

According to the present invention, there is provided the foamed polyolefin resin beads, in which shrinkage of the foamed resin beads which is observed when the polymer type antistatic agent is mixed with the foamed polyolefin resin beads is suppressed and fusion bonging properties between foamed resin beads are good.

Further, according to the present invention, there is provided the molded foamed article of polyolefin resin which is molded in a mold using the foamed polyolefin resin beads and has the antistatic performance, a good surface condition, and an excellent mechanical strength.

In the present invention, it is found that composite resin beads include a core layer constituted by a crystalline polyolefin resin, a covering layer constituted by a crystalline polyolefin resin having a melting point lower than that of the resin constituting the core layer or a covering layer constituted by a noncrystalline polyolefin resin having a softening point lower than the melting point of the resin constituting the core layer and the polymer type antistatic agent is blended with the covering layer, which is foamed and expanded and the obtained foamed polyolefin resin beads can achieve the above-described object.

That is, the present invention provides the following:

[1] foamed polyolefin resin beads obtained by foaming and expanding composite resin beads which include a core layer constituted by a polyolefin resin and a covering layer which covers the core layer constituted by a polyolefin resin, wherein (a) the polyolefin resin constituting the core layer is a crystalline polyolefin resin, (b) the polyolefin resin constituting the covering layer is a crystalline polyolefin resin which has a lower melting point (B) than a melting point (A) of the polyolefin resin constituting the core layer, wherein a temperature difference [(A)–(B)] between the melting point (B) and the melting point (A) is more than 0° C. and 80° C. or less, or a noncrystalline polyolefin resin which has a softening point (C) lower than the melting point (A) of the polyolefin resin constituting the core layer, wherein a temperature difference [(A)–(C)] between the softening point (C) and the melting point (A) is more than 0° C. and 100° C. or less, and 10% by weight or more and less than 50% by weight of polymer type antistatic agent is contained in the covering layer.

[2] the foamed polyolefin resin beads according to a first aspect, wherein the polyolefin resin constituting the covering layer is a crystalline polyolefin resin which has a lower melting point (B) than a melting point (A) of the polyolefin resin constituting the core layer, wherein a temperature difference [(A)–(B)] between the melting point (A) and the melting point (B) is in the range of 1 to 80° C., or a noncrystalline polyolefin resin which has a lower softening point (C) than a melting point (A) of the polyolefin resin constituting the core layer, wherein a temperature difference [(A)–(C)] between the melting point (A) and the softening point (C) is in the range of 1 to 100° C.;

[3] the foamed polyolefin resin beads according to the first aspect, wherein the polyolefin resin constituting the covering layer is a crystalline polyolefin resin which has a lower melting point (B) than a melting point (A) of the polyolefin resin constituting the core layer, wherein a temperature difference [(A)–(B)] between the melting point (A) and the melting point (B) is in the range of 5 to 60° C., or a noncrystalline polyolefin resin which has a lower softening point (C) than a melting point (A) of the polyolefin resin constituting the core layer, wherein a temperature difference [(A)–(C)] between the melting point (A) and the softening point (C) is in the range of 5 to 60° C.;

[4] the foamed polyolefin resin beads according to the first aspect, wherein the core layer does not substantially contain the polymer type antistatic agent

[5] the foamed polyolefin resin beads according to the first aspect, wherein 5 to 15% by weight of polymer type antistatic agent is contained in the core layer.

[6] the foamed polyolefin resin beads according to the first aspect, wherein the crystalline polyolefin resin constituting the core layer is a polypropylene resin

[7] the foamed polyolefin resin beads according to the sixth aspect, wherein the polyolefin resin constituting the covering layer is the polypropylene resin.

[8] the foamed polyolefin resin beads according to the first aspect, wherein a weight ratio of the core layer and the covering layer is in the range of 99.5:0.5 to 80:20.

[9] the foamed polyolefin resin beads according to the first aspect, wherein the weight ratio of the core layer and the covering layer is in the range of 98:2 to 80:20.

[10] the foamed polyolefin resin beads according to the first aspect, wherein the weight ratio of the core layer and the covering layer is in the range of 96:4 to 90:10.

[11] the foamed polyolefin resin beads according to the first aspect, wherein the polyolefin resin constituting the covering layer is a polyolefin resin polymerized with a metallocene polymerization catalyst.

[12] the foamed polyolefin resin beads according to the first aspect, wherein the covering layer of the foamed beads is substantially solid.

[13] the foamed polyolefin resin beads according to the first aspect, wherein a ratio (X/Y) of an apparent density (X) of foamed beads after pressurizing with a compressed air under conditions of 30° C. and 0.2 MPa (G) for 24 hours and leaving under an ordinary pressure at 23° C. for 24 hours to an apparent density (Y) of foamed beads before the pressurization is in the range of 0.8 to 1.0.

Further, the present invention relate to a molded foamed article of polyolefin resin produced by molding the foamed polyolefin resin beads in a molding cavity according to the first to thirteenth aspects, where the molded foamed article has the surface resistivity of less than $1 \times 10^{14} \Omega$.

The foamed polyolefin resin beads (hereinafter may be referred to as simply "foamed resin beads" or "foamed beads") of the present invention are foamed resin beads obtained by foaming and expanding composite resin beads including the core layer and the covering layer, the resin constituting the core layer is the crystalline polyolefin resin, the covering layer includes the crystalline polyolefin resin having the melting point lower than that of the crystalline polyolefin resin constituting the core layer or the noncrystalline polyolefin resin having the softening point lower than the melting point of the crystalline polyolefin resin constituting the core layer, and a specific amount of the polymer type antistatic agent is blended with the covering layer. Therefore, there is no shrinkage of foamed resin beads or the shrinkage is small due to the water absorption of the antistatic agent. Further, molding in a mold can be performed without causing damage to the cell structure of the core layer of the foamed resin beads when foamed resin beads are heated at a fusable temperature and foamed resin beads are excellent in fusion bonding properties.

The foamed polyolefin resin beads in the present invention can provide the molded foamed article which is excellent in antistatic performance, prevents or reduces the transfer (transcription) of the antistatic agent to packaging products, hardly has deterioration of the antistatic performance with age, whose antistatic performance is hardly humidity dependent, whose shrinkage after molding is sufficiently suppressed, and has a good surface condition, and an excellent mechanical strength.

The foamed resin beads of the present invention have the multilayered structure as described above. When the antistatic agent is blended with the covering layer at a predetermined ratio, the desired antistatic effect can be obtained. Thus, it is not necessarily needed that the antistatic agent is blended with the core layer. Generally, a relatively large amount of the polymer type antistatic agent is necessary to obtain antistatic effects. In the present invention, the desired antistatic performance can be exhibited by having the above-described structure even if the polymer type antistatic agent is not blended with the core layer or the blending amount of the polymer type antistatic agent is small. Therefore, foaming properties of the foamed resin beads are not inhibited and are not greatly shrunk, thereby producing the molded foamed article having the desired mechanical strength. Further, when the blending amount of the antistatic agent is small based on all of the foamed resin beads, sufficient antistatic performance can be exhibited. A step of coating foamed resin beads with the resin containing the antistatic agent after production of the foamed resin beads is not necessary. Thus, foamed resin beads having antistatic properties can be produced at low cost.

DETAILED DESCRIPTION OF EMBODIMENTS

Figure 1:
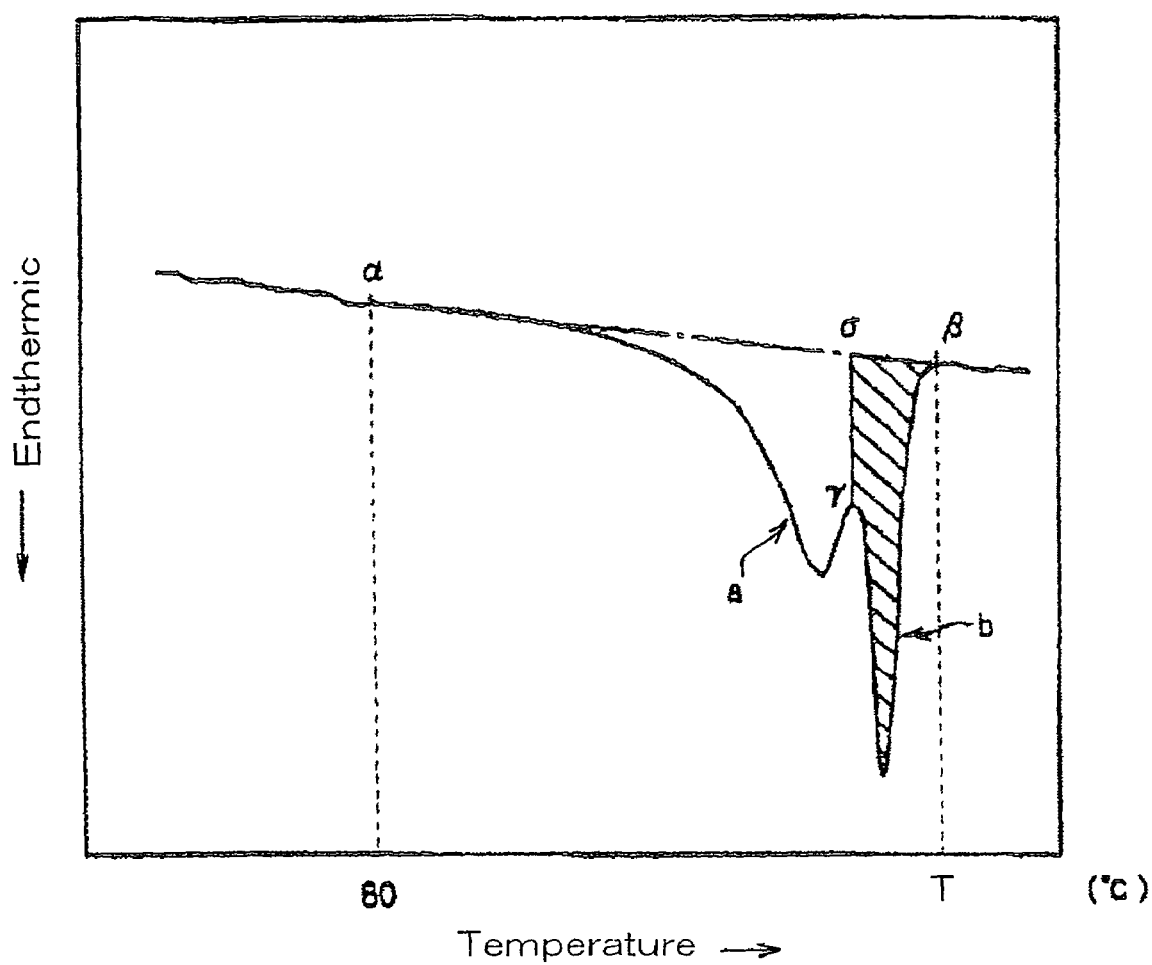
FIG. 1 illustrates an example of a DSC curve in the first measurement of foamed resin beads by heat flux differential scanning calorimetry.

The foamed polyolefin resin beads of the present invention are foamed resin beads obtained by foaming and expanding composite resin beads which include a core layer constituted by a polyolefin resin and a covering layer which covers the core layer constituted by another polyolefin resin different from the polyolefin resin of the core layer, where the polyolefin resin constituting the core layer of the composite resin beads is a crystalline polyolefin resin, the polyolefin resin constituting the covering layer is a crystalline polyolefin resin which has a lower melting point (B) than a melting point (A) of the polyolefin resin constituting the core layer, wherein a temperature difference [(A)–(B)] between the melting point (B) and the melting point (A) is more than 0° C. and 80° C. or less, or a noncrystalline polyolefin resin which has a softening point (C) lower than the melting point (A) of the polyolefin resin constituting the core layer, wherein a temperature difference [(A)–(C)] between the softening point (C) and the melting point (A) is more than 0° C. and 100° C. or less, and 10% by weight or more and less than 50% by weight of polymer type antistatic agent is contained in the covering layer.

The foamed polyolefin resin beads of the present invention are foamed resin beads obtained by foaming and expanding composite resin beads including the core layer and the covering layer, and have a composite structure including the core layer in a foaming state and the covering layer which is substantially non-foaming. Hereinafter, the core layer and the covering layer of composite resin beads are referred to as a "core layer (R)" and a "covering layer (R)", respectively. The core layer and the covering layer of foamed resin beads obtained by foaming and expanding the composite resin beads are referred to as a "core layer (E)" and a "covering layer (E)", respectively.

The foamed polyolefin resin beads of the present invention are produced by foaming and expanding the composite resin beads including the core layer (R) and the covering layer (R). For that reason, in the foamed resin beads, the core layer (R) corresponds to the core layer (E) and the covering layer (R) corresponds to the covering layer (E). Therefore, the polyolefin resin constituting the covering layer (E) of the foamed resin beads is identical to the polyolefin resin constituting the covering layer (R). The polyolefin resin constituting the core layer (E) of the foamed resin beads is identical to the polyolefin resin constituting the core layer (R).

It is preferable that the covering layer (E) of foamed resin beads in the present invention is a resin layer which is substantially solid. When the covering layer (E) of foamed resin beads is solid, the mechanical strength of a molded foamed article which is produced by molding the foamed resin beads in a mold can be maintained at a high level. Here, the term "solid" includes not only a solid in which cells are not present (including a solid in which cells once formed at the time of producing the foamed resin beads had been melt-destroyed and the cells were disappeared) but also a solid in which very minute cells are slightly present.

Usually, as the additive amount of the polymer type antistatic agent to the resin constituting foamed resin beads is increased, fusion bonding properties between the foamed resin beads are reduced. In order to sufficiently fuse the foamed resin beads, they need to be heated at higher temperatures. In the present invention, the foamed resin beads are composed of a core layer (E) and covering layer (E), a resin constituting the covering layer (E) has a melting point or a softening point lower than a melting point of the resin constituting the core layer (E). Therefore, foamed resin beads of the present invention can be fused-bonded at a temperature lower than that of foamed resin beads including a polymeric antistatic agent which do not have the covering layer (E) even when a lot of polymer type antistatic agents are added to the covering layer (E) or foamed resin beads which do not have a melting point difference between the core layer (E) and the covering layer (E) substantially even if they have the covering layer (E). Thus, the foamed resin beads can be fused-bonded without affecting a cell structure of the core layer (E) and a high antistatic performance can be achieved. Further, the foamed resin beads of the present invention are produced by foaming and expanding the composite resin beads in which the antistatic agent is contained in the covering layer (R). Therefore, the antistatic effect thereof is higher than that of foamed resin beads whose surface is simply coated with the resin containing the antistatic agent in the post process, because of the covering layer (R) is drawn out at the time of foaming and expanding, the antistatic agent is suitably oriented in the resin, a network structure of the antistatic agent is constructed.

The term "polyolefin resin" as used herein means a resin corresponding to any of the following (a) to (e):

(a) a homopolymer of ethylene and α-olefins such as propylene and butene-1 (hereinafter ethylene and α-olefins are collectively referred to as "olefin".);

(b) a copolymer selected from two or more olefins;

(c) a copolymer of olefin component and other monomer components such as styrene where an olefin component unit of the copolymer is 30% by weight or more, preferably 50% by weight or more, more preferably 70% by weight or more, further preferably 80% by weight or more, most preferably 90% by weight or more;

(d) two or more mixtures selected from the group consisting of (a), (b), and (c) described above; and (e) a mixed resin composition of one or two or more selected from the group consisting of (a), (b), (c), and (d) described above with other thermoplastic resins except (a), (b), (c), and (d) described above and/or other elastomers where the content of olefin resin in the composition is 30% by weight or more, preferably 50% by weight or more, more preferably 70% by weight or more, further preferably 80% by weight or more, most preferably 90% by weight or more.

A preferable example of the polyolefin resin in the present invention is a resin corresponding to any of the following (f) to (i):

(f) propylene homopolymer;

(g) a copolymer of propylene and other monomers where the content of propylene is 30% by weight or more, preferably 50% by weight or more, more preferably 70% by weight or more, further preferably 80% by weight or more, particularly preferably 90% by weight or more;

(h) two or more mixtures selected from the group consisting of (f) and (g) described above; and (i) a resin composition including a mixture of one or two or more selected from the group consisting of (f), (g), and (h) described above with other thermoplastic resins except (f), (g), and (h) described above and/or other elastomers where the content of polypropylene resin in the mixed resin composition is 30% by weight or more, preferably 50% by weight or more, more preferably 70% by weight or more, further preferably 80% by weight or more, particularly preferably 90% by weight or more.

Specific examples of (a) include polyethylene resin, polypropylene resin, and polybutene resin. Specific examples of (b) include an ethylene-propylene copolymer and an ethylene-propylene-butene-1 copolymer. These copolymers may be either a block copolymer or a random copolymer.

With reference to (e) or (i) described above, other examples of the thermoplastic synthetic resin and elastomers include vinyl acetate resin, thermoplastic polyester resin, acrylic ester resin, methacrylic ester resin, polystyrene resin, polyamide resin, fluorocarbon resin, ethylene-propylene rubber, ethylene-propylene-diene rubber, ethylene-acrylic rubber, chlorinated polyethylene rubber, and chlorosulfonated polyethylene rubber.

The polyolefin resin constituting the core layer (R) of the present invention is the crystalline polyolefin resin. The term "crystalline polyolefin resin" used herein means a polyolefin resin which shows a clear endothermic peak accompanying the melting of the polyolefin resin of a DSC curve when a DSC curve is taken at a heating rate of 10° C./min with a heat flux differential scanning calorimetry apparatus (hereinafter referred to as a DSC apparatus) in accordance with "when a melting temperature is measured after performing a constant heat treatment" described in JIS K7121 (1987) (both a heating rate and a cooling rate in controlling the condition of the specimen are 10° C./min). In this regard; a lower limit of the calorific value of endothermic peak is 2 J/g. On the other hand, the polyolefin resin which does not exhibit a clear endothermic peak, that is, whose calorific value of the endothermic peak is less than 2 J/g is a noncrystalline polyolefin resin.

Examples of the crystalline polyolefin resin constituting the core layer (R) of the present invention include polyethylene resin, polypropylene resin, and polybutene resin. Propylene homopolymer, ethylene-propylene copolymer, and ethylene-propylene-butene-1 copolymer are preferable since they are excellent in balance between heat resistance and mechanical properties. These copolymers may be either the block copolymer or the random copolymer.

The polymerization catalyst which is used when polymerizing the polypropylene resin to be used in the present invention is not particularly limited. An organometallic complex with a performance as the polymerization catalyst can be used. Usable examples thereof include the polymerization catalyst generally referred to as Ziegler-Natta catalyst and referred to as the metallocene catalyst or homogeneous catalyst. Ziegler-Natta catalyst is an organometallic complex obtained by using titanium, aluminum, and magnesium as nucleus elements and modifying a part or all of them with an alkyl group. The metallocene catalyst is an organometallic complex obtained by using transition metals such as zirconium, titanium, thorium, lutetium, lanthanum, and iron, or boron as nucleus elements and modifying them with a cyclopentane ring. Alternatively, a combination of the organometallic complex and methylalumoxane may be used.

Among the polypropylene resins, the polypropylene resin which is polymerized with the metallocene polymerization catalyst (hereinafter referred to as mPP) is preferable. As compared mPP to the polypropylene resin which is polymerized with a general Ziegler-Natta catalyst (hereinafter referred to as zPP), when both of the polypropylene resins showing the same melting point are compared, the mechanical strength of mPP is higher and foamed resin beads having an excellent mechanical strength can be obtained. From the above-described viewpoint, the metallocene catalyst which includes a complex having an azulenyl ligand of a silylene bridge is particularly preferable among the metallocene catalysts.

The crystalline polyolefin resin constituting the core layer (R) has preferably a melting point (Tm) of 100 to 250° C., more preferably 110 to 170° C., particularly preferably 120 to 160° C. from the viewpoint of balance between fusion bonding properties in molding in a mold and heat resistance.

The melting point (Tm) is a value determined as a temperature showing the apex of an endothermic peak accompanying the melting of the polyolefin resin on a DSC curve when the DSC curve is drawn by rising temperature at a heating rate of 10° C./min with the DSC apparatus in accordance with "when a melting temperature is measured after performing a constant heat treatment" described in JIS K7121 (1987) (both the heating rate and the cooling rate in controlling the condition of the specimen are 10° C./min). When a plurality of endothermic peaks are present on the DSC curve, the temperature of apex of endothermic peak having the highest apex based on a baseline at the high temperature side among the endothermic peaks is defined as a melting point. As the measuring apparatus, DSCQ1000 (manufactured by TA INSTRUMENTS) can be used.

In the present invention, the core layer (R) may contain additive agents such as catalyst neutralizers, lubricants, and crystal nucleating agents. In this regard, it is desirable that the content is as low as possible within the range which does not impair the object of the present invention. The additive amount of the additive agents varies depending the type and intended use. The additive amount is preferably 15 parts by weight or less based on 100 parts by weight of the crystalline resin, more preferably 10 parts by weight or less, further preferably 5 parts by weight or less, particularly preferably 1 part by weight or less.

Usable examples of the polyolefin resin constituting the covering layer (R) of the present invention include the crystalline polyolefin resin which has the melting point lower than that of the polyolefin resin constituting the core layer (R) or the noncrystalline polyolefin resin which does not substantially show the melting point and has the softening point lower than the melting point of the polyolefin resin constituting the core layer (R). The same type of polyolefin resin constituting the covering layer (R) as the resin constituting the core layer (R) can also be used.

In the polyolefin resin constituting the covering layer (R), examples of the crystalline polyolefin resin exhibiting a melting point include polypropylene resin described above, low-pressure process high density polyethylene, low-pressure process low density polyethylene, high-pressure process low density polyethylene resin, linear low density polyethylene resin, ultra low density polyethylene resin and polyethylene copolymers prepared from ethylene and monomers such as vinyl acetate, unsaturated carboxylic acid ester, unsaturated carboxylic acid, and vinyl alcohol. Examples of the noncrystalline polyolefin resin include polyethylene rubbers such as ethylene-propylene rubber, ethylene-propylene-diene rubber, ethylene-acrylic rubber, chlorinated polyethylene rubber, and chlorosulfonated polyethylene rubber; polyolefin elastomer, and noncrystalline polypropylene resin.

With reference to the polyolefin resin constituting the covering layer (R), polypropylene resin (i.e., crystalline polyolefin resin), high-pressure process low density polyethylene resin, low-pressure process low density polyethylene, and linear low density polyethylene resin are preferable among the polyolefin resins described above. Among the resins, the polyolefin resin polymerized using metallocene polymerization catalyst is more preferable. The polyolefin resin polymerized using the metallocene polymerization catalyst is further excellent in fusion bonding properties with other polyolefin resins since the content of a low molecular weight component is lower than that of the polyolefin resin polymerized using Ziegler Natta polymerization catalyst. When the polyolefin resin polymerized using the metallocene polymerization catalyst is used for the resin constituting the covering layer (R), the fusion bonding properties of foamed resin beads become more excellent. Further, the adhesive property of the core layer (R) to the covering layer (R) becomes more excellent. Therefore, the molded foamed article obtained from the foamed resin beads is more excellent in mechanical properties. When the resin constituting the core layer (R) is the polypropylene resin and the resin constituting the covering layer (R) is the polypropylene resin, the adhesive property of the core layer (R) and the covering layer (R) is excellent. Thus, the productivity is excellent and the molded foamed article obtained by molding the foamed resin beads in a mold has an excellent mechanical strength, which is preferable. When mPP is used, the above-described effect is increased and the fusion bonding properties of the foamed resin beads are further excellent, which is more preferable.

The melting point of the polyolefin resin constituting the covering layer (R) of the present invention needs to be lower than the melting point of a crystalline polyolefin resin constituting the core layer (R) in the case that the polyolefin resin constituting the core layer (R) is a crystalline polyolefin resin. In the case that the polyolefin resin constituting the core layer (R) is a noncrystalline resin, the softening point of the polyolefin resin constituting the covering layer (R) of the present invention needs to be lower than the melting point of the polyolefin resin constituting the core layer (R).

However, when the melting point or softening point of the polyolefin resin constituting the covering layer (R) is too lower than the melting point of the polyolefin resin constituting the core layer (R), the fusion between the foamed resin beads is caused at the time of foaming and the blocking of the foamed resin beads can be occurred. Further, the heat resistance of the molded foamed article produced by molding the foamed resin beads in a mold can be deteriorated. Even in the case that the melting point or softening point of the resin constituting the covering layer (R) is low, when there is no difference between the melting points of the resin constituting the core layer (R) and the resin constituting the covering layer (R), the desired object of the present invention for improving the fusion bonding properties cannot be achieved without any damage is not given to the cell structure of the foamed resin beads.

Based on this standpoint, when the polyolefin resin constituting the covering layer (R) is the crystalline polyolefin resin, the crystalline polyolefin resin to be used has the temperature difference [(A)–(B)] between the melting point (A) of the polyolefin resin constituting the core layer (R) and the melting point (B) of the polyolefin resin constituting the covering layer (R) being more than 0° C. and 80° C. or less. The temperature difference is preferably in the range of 1 to 80° C., more preferably in the range of 5 to 60° C., further preferably in the range of 10 to 50° C., particularly preferably in the range of 15 to 45° C.

On the other hand, when the polyolefin resin constituting the covering layer (R) is the noncrystalline polyolefin resin, the noncrystalline polyolefin resin to be used has the temperature difference [(A)–(C)] between the melting point (A) of the polyolefin resin constituting the core layer (R) and the softening point (C) of the polyolefin resin constituting the covering layer (R) being more than 0° C. and 100° C. or less. The temperature difference is preferably in the range of 1 to 100° C., more preferably in the range of 5 to 60° C., further preferably in the range of 10 to 50° C., particularly preferably in the range of 15 to 45° C. From the viewpoint of handling and heat resistance of the molded foamed article to be obtained, the relationship of the melting point of the crystalline polyolefin resin and the softening point of the noncrystalline polyolefin resin constituting the covering layer (R) with the melting point of the crystalline polyolefin resin constituting the core layer (R) satisfies the above-described range. The melting point of the crystalline polyolefin resin and the softening point of the noncrystalline polyolefin resin constituting the covering layer (R) are preferably 40° C. or more, more preferably 60° C. or more, further preferably 80° C. or more, particularly preferably 90° C. or more.

In the present invention, the term "softening point" means a vicat softening point measured by the A50 method based on JIS K7206 (1999). A specimen for measurement (20 mm long×20 mm wide×3 mm thick) is produced by pressurizing an amorphous polyolefin resin at 230° C. 5 MPa so as not to contain bubbles. The obtained specimen is used for measurement without annealing treatment. As the measuring apparatus, HDT/VSPT test equipment MODEL TM-4123 (manufactured by Ueshima Seisakusho Co., Ltd.) and the like can be used.

If necessary, additive agents such as lubricants, catalyst neutralizers, and antioxidizing agents can be added to the covering layer (R) within the range which does not impair the object of the present invention. The additive amount varies depending on the type of additive agent and it is preferably 15 parts by weight or less based on 100 parts by weight of polyolefin resin, more preferably 10 parts by weight or less, further preferably 5 parts by weight or less, particularly preferably 1 part by weight or less.

In the present invention, the polymer type antistatic agents are blended with the covering layer (R), the blending amount is in the range of 10% by weight or more and less than 50% by weight based on the total weight of the covering layer (R). When the blending amount of the polymer type antistatic agent is less than 10% by weight, the desired antistatic function cannot be obtained. On the other hand, when the blending amount is 50% by weight or more, the fusion bonding properties of the foamed resin beads are reduced and the surface condition of the molded foamed article is deteriorated. Thus, a good molded foamed article cannot be obtained. Further, when the blending amount is 50% by weight or more, the antistatic performance is hardly changed and any effect worth the blending amount cannot be obtained. Thus, the cost performance is worsened. From this viewpoint, the lower limit as to the blending amount of the antistatic agent to the covering layer (R) is preferably 12% by weight, more preferably 15% by weight. On the other hand, the upper limit is preferably 40% by weight, more preferably 30% by weight.

In the present invention, the polymer type antistatic agent is blended with the covering layer (R) in the above described manner. From the viewpoint of importance to the antistatic properties, the molded foamed article obtained by blending the polymer type antistatic agent to the core layer (R) within the range which does not disturb the foaming foamed resin beads and the range which does not cause a large shrinkage of foamed resin beads can exhibit a further excellent antistatic performance. When the cross section of the foamed resin beads has a portion in which the covering layer is not present or when the molded foamed article have the cutting surface obtained by cutting the molded foamed article, the antistatic agent is present in the core layer (E). Thus, the surface of the whole molded foamed article is a phase containing the antistatic agent, an excellent antistatic effect can be obtained.

When a small amount of the antistatic agent is blended to the core layer (R), the blending amount of the antistatic agent to be contained in the covering layer (R) can be decreased without reducing the antistatic performance. Therefore, the fusion bonding properties between foamed resin beads become more excellent. In this case, it is necessary to set the blending amount of the antistatic agent to the core layer (R) to the range which does not disturb the foaming. The upper limit as to the blending amount of the antistatic agent to the core layer (R) is 15% by weight or less based on the total weight of the core layer (R), preferably 12% by weight or less, more preferably 8% by weight or less.

On the other hand, the lower limit as to the blending amount of the antistatic agent is preferably 5% by weight or more, more preferably 7% by weight or more from the viewpoint of obtaining a high antistatic performance. When the antistatic agent is blended to the core layer (R), it is preferable to adjust the antistatic performance by making the blending amount of the antistatic agent to the core layer (R) lower than the blending amount of the antistatic agent of the covering layer (R) from the viewpoint of cost performance of the antistatic performance.

When the antistatic agent is blended to the core layer (R), the mechanical strength of foamed resin beads tends to easily lowered. Thus, it is preferable to use mPP as the polyolefin resin constituting the core layer (R). Particularly, mPP polymerized with the metallocene catalyst which includes a complex having an azulenyl ligand of a silylene bridge among the metallocene catalysts is preferable.

On the other hand, from the viewpoint of the mechanical strength of the molded foamed article, it is preferable that the core layer (R) does not substantially contain the antistatic agent. In general, the mechanical strength of the antistatic agent in itself is lower than that of the polyolefin resin to be used in the present invention. Additionally, the mechanical strength of the base material in itself is easily lowered by mixing with different types of raw materials, and a reduction in the foaming properties is easily caused. Thus, the mechanical strength of the foamed resin beads is lowered by blending the antistatic agent to foamed resin beads. However, when foamed resin beads are produced without adding the antistatic agent to the core layer (R), the foamed resin beads have the mechanical properties equivalent to those of general foamed resin beads which do not include the antistatic agent. When the antistatic agent is not included in the core layer (R), the lower limit of the blending amount of the antistatic agent of the covering layer (R) is preferably 20% by weight, more preferably 25% by weight, further preferably 28% by weight in order to obtain the desired antistatic performance.

The term "not substantially contain" means that the blending amount of the antistatic agent is the blending amount in which foamed resin beads having foaming properties equivalent to those of the foamed resin beads which do not include the antistatic agent and mechanical properties can be obtained and any antistatic performance is not exhibited. Usually, it is 3% by weight or less (0 is included).

The polymer type antistatic agent used in the present invention is a resin with a surface resistivity of less than $1 \times 10^{12} \Omega$. Specifically, an ionomer resin containing alkali metal selected from the group consisting of potassium, rubidium, and cesium as a metal ion or a resin containing hydrophilic resins such as polyether ester amide and polyether as a main component are preferable. It is further preferable to use the resin block-copolymerized with the polyolefin resin as the polymer type antistatic agent in order to improve compatibility with the polyolefin resin constituting the foamed resin beads and obtain an effect which suppresses the reduction of the mechanical property caused by adding the antistatic agent.

Particularly preferable examples of the polymer type antistatic agent include compositions described in JP-A Nos. 3-103466 and 2001-278985.

A composition described in JP-A No. 3-103466 includes the following components:
(I) a thermoplastic resin;
(II) polyethylene oxide or a block copolymer which contains 50% by weight or more of polyethylene oxide block component; and
(III) metal salt which is dissolved in the polyethylene oxide block component described in (II).

Further, a composition described in JP-A No. 2001-278985 is a block copolymer having a number average molecular weight (Mn) of 2000 to 60000 which has a structure in which a block (a) of polyolefin is repeatedly and alternatively bonded to a block (b) of a hydrophilic resin having a volume resistivity value of $1 \times 10^5$ to $1 \times 10^{11}$ $\Omega \cdot cm$. The block (a) and the block (b) have a structure in which they are bonded repeatedly and alternatively via at least one bond selected from the group consisting of an ester bond, an amide bond, an ether bond, an urethane bond, and an imide bond.

The number average molecular weight of the polymer type antistatic agent to be used herein is preferably 2000 or more, more preferably in the range of 2000 to 100000, further preferably 5000 to 60000, particularly preferably 8000 to 40000. In this regard, the upper limit of the number average molecular weight of the polymer type antistatic agent is approximately 500000. When the number average molecular weight of the polymer type antistatic agent is in the above described range, the antistatic performance is not influenced by environment such as humidity and is more stably exhibited. Further, the transfer of the antistatic agent to packaging products is not observed.

The number average molecular weight is determined using high temperature gel permeation chromatography. For example, when the polymer type antistatic agents containing polyether ester amide and polyether as main components are used, the number average molecular weight is a value measured under conditions where orthodichlorobenzene is used as a solvent, a sample concentration is 3 mg/ml, polystyrene is used as a reference substance, and a column temperature is 135° C. In this regard, the type of the solvent and the column temperature are suitably changed depending on the type of polymer type antistatic agent.

The melting point of the polymer type antistatic agent is preferably 70 to 270° C., more preferably 80 to 230° C., further preferably 80 to 200° C., particularly preferably 90 to 180° C. from the viewpoint of the antistatic functions. It is desired that the difference between the melting point of the polyolefin resin constituting the covering layer (R) and the melting point of the polymer type antistatic agent or the difference between the softening point of the polyolefin resin constituting the covering layer (R) and the melting points of the polymer type antistatic agent (when the polyolefin resin constituting the covering layer (R) does not have the melting point) is preferably 150° C. or less, particularly preferably 100° C. or less from the viewpoint of dispersibility to the polyolefin resin at the time of kneading and fusion bonding properties at the time of molding.

The melting point of the polymer type antistatic agent can be measured by the method based on JIS K7121 (1987). That is, pretreatment is performed under the condition of the controlling the condition of the specimen (2) of specimen based on JIS K7121 (1987) (where the cooling rate is 10° C./min) and a DSC curve is obtained by rising temperature at a heating rate of 10° C./min. The temperature of the apex of the obtained endothermic peak is defined as a melting point. When two or more endothermic peaks appear, the apex of the main endothermic peak (peak with the largest area) is defined as the melting point. When another peak with a peak area of 80% or more to the peak area of the peak with the largest area is present, an arithmetical average value of a temperature of the apex of the peak and a temperature of the apex of the peak with the largest area is used as the melting point.

The polymer type antistatic agents may be respectively used alone or in combination. In this regard, the polymer type antistatic agents are available as commercialized products (for example, SD100, manufactured by DU PONT-MITSUI POLYCHEMICALS CO., LTD., PELESTAT 300, PELESTAT 230, and PELESTAT 3170, manufactured by Sanyo Chemical Industries, Ltd,).

The composite resin beads consist of the core layer (R) and the covering layer (R) according to the present invention can be produced using the co-extrusion die described in JP-B Nos. 41-16125, 43-23858, 44-29522, and JP-A No. 60-185816. Generally, composite resin beads are obtained by the steps of melt-kneading necessary polyolefin resin components with the polymer type antistatic agent, and if necessary the additive agent, by the extruder for the core layer, melt-kneading necessary polyolefin resin components with the polymer type antistatic agent, and if necessary the additive agent, by the extruder for the covering layer, allowing each of the melt-kneaded products to be joined in the co-extrusion die connected to end of an extruder for the core layer and end of an extruder for the covering layer, forming a sheath-core type of composite body which includes the cylindrical core layer (R) in a non-foaming state and the covering layer (R) in the non-foaming state which covers the side surface of the core layer (R), extruding the composite body from a small hole of the die into a strand shape, and cutting particles with a pelletizer so as to have a predetermined weight of the particles. Hereinafter, such a composite structure may be referred to as a "sheath-core" structure.

The weight ratio (% by weight) of the core layer (R) of the composite resin beads to the covering layer (R) is preferably 99.5:0.5 to 98:20, more preferably 98:2 to 80:20, further preferably 96:4 to 90:10.

When the weight ratio of the covering layer (R) is too small, the thickness of the covering layer (E) becomes too thin. As a result, effect of improvement in fusion bonding properties cannot be obtained, the fusion bonding between foamed resin beads is easily insufficient. Further, the antistatic effect may become insufficient. On the other hand, when the weight ratio of the covering layer (R) is too large, the mechanical properties of the covering layer (E) of foamed resin beads in themselves tend to be reduced, since the resin having the melting point or softening point lower than the melting point of the core layer (R) is used for the covering layer (R). Further, the covering layer (R) foams easily. When the ratio of the covering layer (R) to all of the foamed resin beads is increased, the mechanical properties of the molded foamed article tend to be reduced. That is, when the weight ratio of the core layer (R) and the covering layer (R) is within the range described above, the antistatic properties and fusion bonging properties are excellent. Further, as for the molded foamed article obtained by molding foamed resin beads in a mold, cells are not present near the fused interface of the foamed resin beads, the fusing strength between the foamed resin beads is particularly strong, and the molded foamed article is excellent in mechanical strength.

It is preferable that the thickness of the covering layer (R) of the composite resin beads is thin. This is because cells in the covering layer (E) are hardly generated when the composite resin beads are foamed and expanded. However, when the thickness is too thin, effect of improvement in fusion bonding properties between foamed resin beads is reduced and further it becomes difficult to sufficiently cover the core layer (R) in itself. When the thickness of the covering layer (R) is too thick, cells are easily produced in the covering layer (E) at the time of foaming and expanding the composite resin beads, which can cause a reduction in the mechanical strength of the molded foamed article. Therefore, the thickness of the covering layer (E) of the foamed resin beads is preferably 0.1 to 200 μm, more preferably 0.5 to 50 μm. The thickness of the covering layer (R) at the stage of composite resin beads needs to be adjusted so that the thickness of the covering layer (E) of the foamed resin beads is within the above described range. Although the thickness of the covering layer (R) varies depending on the size of composite resin beads and the expansion ratio, it is preferably 5 to 500 μm, more preferably 10 to 100 μm.

The foamed resin beads of the present invention are produced by dispersing the composite resin beads composed of the core layer (R) and the covering layer (R) into an aqueous medium (generally water) in a closable container (e.g. autoclave) which can be pressurized, adding a dispersing agent, injecting a predetermined amount of a blowing agent and pressurizing, stirring under heating for a predetermined time, impregnating the composite resin beads with the blowing agent, and then releasing the aqueous medium and contents into a low-pressure area with an internal container pressure to allow them to foam and expand. At the time of the release, it is preferable that the contents are released by applying back pressure to the container. Particularly, when foamed resin beads having a high expansion ratio are produced, the foamed resin beads can be obtained by curing the foamed resin beads obtained in the above-described manner (a usual curing step) at atmospheric pressure, charging the foamed resin beads into a closable container which can be pressurized, pressurizing with a gas under pressure such as air, performing an operation for increasing the pressure in the foamed resin beads, taking out the foamed resin beads from the container, heating them using heating medium such as steam and hot air (hereinafter referred to as two-stage expanding).

In the present invention, the blowing agent is not particularly limited. For example, hydrocarbons such as butane, pentane, and hexane; halogenated hydrocarbons such as trichlorofluoromethane, dichlorofluoromethane, tetrachlorodifluoroethane, and dichloromethane; inorganic gases such as carbon dioxide, nitrogen, and air; and water may be used alone or two or more of them may be used in combination. Among these blowing agents, it is preferable to use a physical blowing agent containing inorganic physical blowing agents such as carbon dioxide, nitrogen, and air as main components. It is more preferable to use carbon dioxide. In the present invention, the term "containing inorganic physical blowing agents as main components" means that the content of the inorganic physical blowing agent is 50 mol % or more based on 100 mol % of the physical blowing agent, preferably 70 mol % or more, more preferably 90 mol % or more. When an organic physical blowing agent is used, it is preferable to use normal butane, isobutane, normal pentane, and isopentane as the organic physical blowing agent from the viewpoint of compatibility with the polyolefin resin and blowing properties.

The additive amount of the physical blowing agents is appropriately adjusted according to the type of blowing agent, the blending amount of antistatic agent, and the apparent density of the desired foamed resin beads and cannot be generally specified. For example, when carbon dioxide is used as the physical blowing agent, the additive amount is 0.1 to 30 parts by weight based on 100 parts by weight of composite resin beads, preferably 0.5 to 15 parts by weight, more preferably 1 to 10 parts by weight.

Examples of the dispersing agent include hardly water-soluble inorganic substances such as aluminum oxide, tri calcium phosphate, magnesium pyrophosphate, zinc oxide, kaolin, and mica; and water-soluble polymer protective colloid agents such as polyvinyl pyrrolidone, polyvinyl alcohol, and methyl cellulose. Further, anionic surfactants such as sodium dodecylbenzenesulfonate and sodium alkane sulfonate can be used.

The resulting foamed resin beads have a composite structure in which the core layer (E) having a microcells in a foaming state and the covering layer (E) which is formed on the surface of the core layer. It is preferable that the apparent density of the foamed resin beads is 10 to 180 kg/m³ and the average cell diameter is 50 to 900 μm. It is further preferable that the average cell diameter is 100 to 300 μm. The foamed resin beads has a ratio of an apparent density of foamed resin beads after pressurizing under constant conditions (with a compressed air at 30° C. and 0.2 MPa (G) for 24 hours) and leaving under an ordinary pressure at 23° C. for 24 hours to an apparent density of foamed resin beads before the pressurization is in the range of 0.8 to 1.0 (apparent density after pressurization/apparent density before pressurization). The shrinkage immediately after foaming is small, the control of density of the foamed resin beads is easy, and the bridge can be hardly generated at the time of transfer. In the case of such foamed resin beads, the time required for a step of applying an internal pressure which is needed for a two-stage expanding step or a pressure molding is shortened. Further, the foamed resin beads have a characteristic in which the mechanical properties are hardly decreased by the shrinkage history.

The apparent density of the foamed resin beads is measured by the following manner. A group of the foamed resin beads (weight, W(g)) is immersed in a graduated cylinder containing water using a wire net and the like. The volume V (L) of the group of the foamed resin beads is calculated from the rising portion of water level. The value (W/V) obtained by dividing the weight (w) of the group of the foamed resin beads by the volume (V) of the group of the foamed resin beads is converted to kg/m³.

In the foamed resin beads of the present invention, it is preferable that one or more peaks of the endothermic peak (high temperature peak) are present at the high temperature side rather than the apex of the endothermic peak (intrinsic peak) inherent to the crystalline polyolefin resin constituting the core layer (R) in the DSC curve obtained by heat flux differential scanning calorimetry (hereinafter simply referred to as "DSC measurement"). The foamed resin beads have a high closed cell ratio and are suitable for fusion bonding.

The calorific value of a high temperature peak to be needed largely varies depending on the type of resin constituting foamed resin beads and further varies depending on the ratio of the core layer (R) to the covering layer (R) or the change in the amount of the additive agent. Therefore, although it is not necessarily appropriate to suggest it, it is preferably 50 J/g or less.

The calorific value of a high temperature peak of foamed resin beads is the calorific value of an endothermic peak b (high temperature peak) which appears at the temperature side higher than the temperature in which an endothermic peak a (intrinsic peak) inherent to the resin constituting foamed resin beads appears in the first DSC curve (shown in FIG. 1) which is obtained when 1 to 3 mg of foamed resin beads are heated up from room temperature (10 to 40° C.) to 220° C. at a heating rate of 10° C./min with the DSC apparatus and corresponds to an area of the high temperature peak b. Specifically, it can be determined in the following manner.

FIG. 1 is an example of the foamed resin beads when polypropylene resin is used as a base resin.

First, a straight line (α–β) which connects a point α corresponding to 80° C. on the DSC curve with a point β on the DSC curve corresponding to a melting end temperature T of foamed resin beads is drawn. Next, a straight line parallel to the vertical axis in the graph is drawn from the point γ on the DSC curve corresponding to the valley portion between the intrinsic peak a and the high temperature peak b and a point that crosses the straight line (α–β) is σ. The area of the high temperature peak b is an area of a portion (shaded portion in FIG. 1) surrounded by a curve of the high temperature peak b on the DSC curve, a line segment (σ–β), and a line segment (γ–σ) and it corresponds to the calorific value of a high temperature peak. In this regard, the term "melting end temperature T" means a point of intersection of the DSC curve at the side of high temperature of the high temperature peak b and the baseline at the high temperature side.

The total (the amount of melting heat as to all of the foamed resin beads) of the calorific value of a high temperature peak and the calorific value of the intrinsic peak corresponds to an area of a portion surrounded by the straight line (α–β) and the DSC curve.

Figure 2:
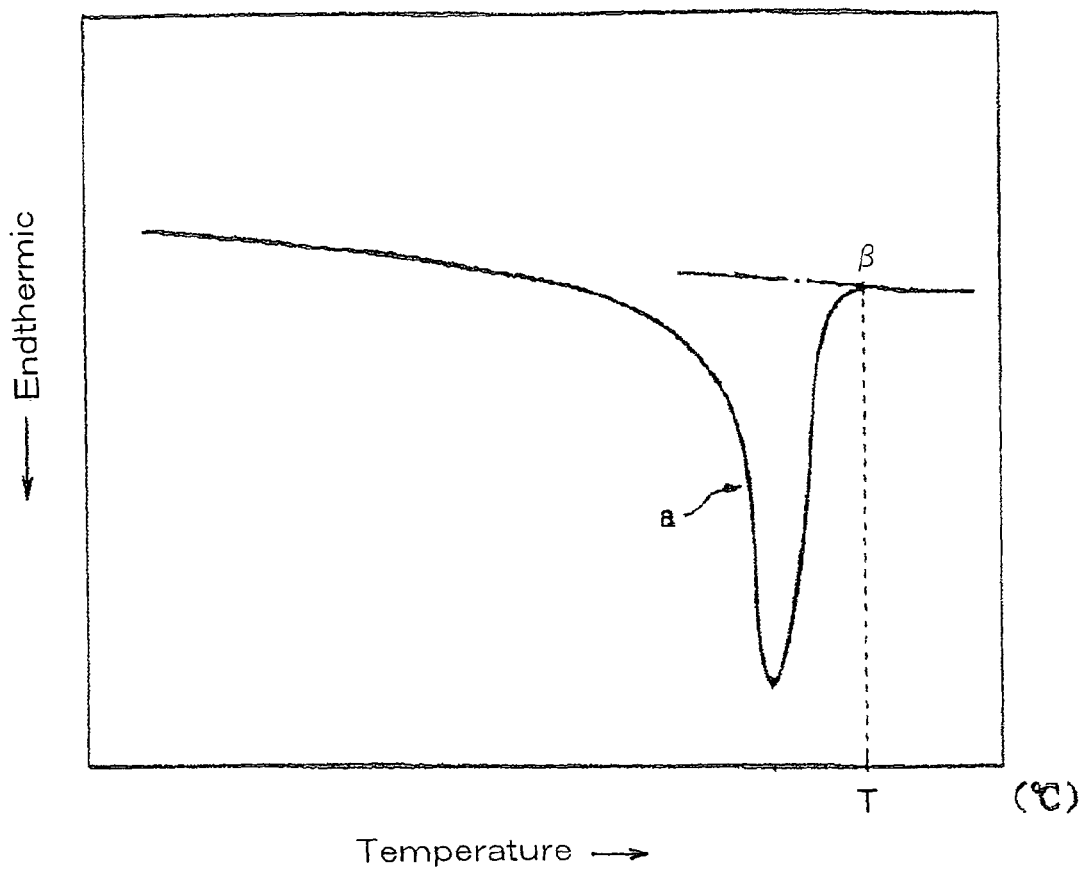
FIG. 2 illustrates an example of a DSC curve in the second measurement of foamed resin beads by heat flux differential scanning calorimetry. Herein, a is an intrinsic peak, b is a high temperature peak, α is a point corresponding to 80° C. on the DSC curve, β is a point corresponding to a melting end temperature, γ is a point corresponding to a valley portion between a and b, σ is a point that crosses a line segment (α–β), and T is the melting end temperature.

In this regard, the high temperature peak b appears in the first DSC curve, however, it does not appear in the second DSC curve obtained when the temperature is once lowered from 220° C. to around 40° C. (40 to 50° C.) at 10° C./min after obtaining the first DSC curve and the temperature is again increased to 220° C. at 10° C./min. As shown in FIG. 2, only the intrinsic peak a of the resin constituting foamed resin beads is observed.

When three or more endothermic peaks appear in the first DSC curve, for example, a mixture of a polyolefin resin containing two or more base resins of foamed resin beads, more specifically, foamed resin beads obtained by foaming and expanding resin beads having the composite structure in which the covering layer is the polyethylene resin and the core layer is the polypropylene resin are listed. In this case, the high temperature peak is not observed in the second DSC curve. Comparison of the first DSC curve with the second DSC curve using the result allows for determining which peak is the high temperature peak.

As the measuring apparatus, DSCQ1000 (manufactured by TA INSTRUMENTS) and the like can be used.

A molding method known in itself can be used as a method for producing the molded foamed article using the foamed resin beads of the present invention.

For example, a reduced-pressure molding method (e.g. JP-B No. 46-38359) which involves the steps of charging foamed resin beads to a molding cavity using a pair of molds for molding conventional foamed resin beads under atmospheric pressure or reduced pressure, closing the mold, compressing so as to reduce the volume in the mold cavity by 5 to 70%, then supplying heating medium such as steam to the mold, heating, and fuse-bonding the foamed resin beads is known. Alternatively, a compression molding method (e.g. JP-B No. 51-22951) which involves the steps of pre-pressurizing foamed resin beads by a pressurized gas to increase the pressure in the foamed resin beads, improving a secondary expanding property of the foamed resin beads, maintaining the secondary expanding property, charging foamed resin beads to a molding cavity under atmospheric pressure or reduced pressure, closing the mold, then supplying heating medium such as steam to the mold, heating, and fuse-bonding the foamed resin beads is used for molding.

Further, a compression filling molding method (JP-B No. 4-46217) which involves the steps of pressurizing the cavity by compressed gas at a pressure higher than atmospheric pressure, charging foamed resin beads pressurized at a pressure higher than that of the cavity, then supplying heating medium such as steam to the cavity, heating, and fuse-bonding the foamed resin beads can be used for molding. In addition, a normal pressure filling method (JP-B No. 6-49795) which involves the steps of charging foamed resin beads having a high level of secondary expanding capability which are obtained in specific conditions to a cavity of a pair of molds under atmospheric pressure or reduced pressure, then supplying heating medium such as steam to the cavity, heating, and fuse-bonding the foamed resin beads or a method combined with the above-described method (JP-B No. 6-22919) can be used for molding.

The fusion bonding rate of the molded foamed article obtained by molding in a mold the foamed resin beads of the present invention is preferably 75% or more, more preferably 80% or more, further preferably 85% or more, particularly preferably 90% or more. The molded foamed article with a high fusion rate is excellent in mechanical strength, particularly flexural strength.

The term "fusion bonding rate" used herein means a material failure rate based on the number of foamed resin beads on the fracture surface when the molded foamed article is bent and fractured. The material at the non-fused portion is not fractured and the interface of foamed resin beads is separated.

The molded foamed article obtained by molding in a mold the foamed resin beads in the present invention is excellent in fusion properties, mechanical properties and, particularly compressive strength. The surface resistivity of the molded foamed article is less than $1\times10^{14}\Omega$, which shows an excellent antistatic property.

The apparent density of the molded foamed article of the present invention is preferably 10 to 180 kg/m$^3$. When the apparent density is within the range described above, the foamed molded body has an excellent balance between light-weight properties and mechanical properties. In order to determine the apparent density, the value obtained by dividing the weight of the molded foamed article by the volume calculated from an outside dimension of the molded foamed article is converted to [kg/m$^3$].

The term "surface resistivity" in the present invention means a value measured based on JIS K 6271 (2001). Specifically, three pieces of specimens (100 mm length×100 mm width×thickness: the thickness of the molded body) cut from the central portion of the molded foamed article are prepared. The specimens are left under conditions of 23° C. and a humidity of 50% RH for 24 hours. Thereafter, a voltage of 500V is applied to each of the specimens under conditions of 23° C. and 50% RH. After 30 seconds, each of the electric current values is measured and each of the surface resistivities is calculated. Each surface resistivity is determined by arithmetic-averaging the surface resistivities for each of the specimens. As the measuring apparatus, Hiresta MCP-HT450 (manufactured by Mitsubishi Chemical Corporation) can be used.

EXAMPLES

Crystalline polyolefins used in Examples and Comparative examples are shown in the following Table 1.

TABLE 1

| Abbreviation | catalysts | Based resins | comonomers | Comonomer amounts % by weight | MFR* g/10 min | Melting point (° C.) |
|---|---|---|---|---|---|---|
| Resin 1 | Metallocene type | Propylene-ethylene random copolymer | Ethylene | 0.5 | 9.0 | 142 |
| Resin 2 | Ziegler Natta type | Propylene-ethylene random copolymer | Ethylene | 2.7 | 7.0 | 142 |
| Resin 3 | Ziegler Natta type | Propylene-ethylene random copolymer | Ethylene | 1.0 | 8.0 | 155 |
| Resin 4 | Ziegler Natta type | Propylene homopolymer | — | — | 5.0 | 162 |
| Resin A | Metallocene type | Propylene-ethylene random copolymer | Ethylene | 2.8 | 7.0 | 125 |
| Resin B | Ziegler Natta type | Propylene-ethylene random copolymer | Ethylene | 1.6 | 7.0 | 135 |
| Resin C | Metallocene type | Linear low density polyethylene | — | — | 2.0 | 100 |

*MFR means a melt mass-flow rate measured by a test method A based on JIS K 7210 (1999).
MRFs of the resins 1 to 4 as well as the resins A and B are values measured under conditions of a test temperature of 230° C. and a load of 2.16 kg.
MFR of the resin C is a value measured under conditions of a test temperature of 190° C. and a load of 2.16 kg.

The polypropylene resin for covering layer formation used in Examples "amorphous PP, softening point: 64° C." is non-crystalline polypropylene resin (grade name: VERSIFY 3200, manufactured by Dow Plastics).

As for polymer type antistatic agents used in Examples, "PEO" represents a polyolefin-polyethylene oxide block copolymer type (trade name: PELESTAT 230, manufactured by Sanyo Chemical Industries Co., Ltd.) and "PEEA" represents a polyether ester amide type (trade name: PELESTAT 3170, manufactured by Sanyo Chemical Industries Co., Ltd.).

[Preparation of Composite Resin Beads Including Core Layer and Covering Layer]

An apparatus to which a die for multilayer strand formation was attached at the outlet side of an extruder for the core layer having an inner diameter of 50 mm and an extruder for the covering layer having an inner diameter of 30 mm was used. The polyolefin resins for constituting the core layer shown in Tables 2 to 4 and the polyolefin resins for constituting the covering layer were supplied to the extruder for the core layer and the extruder for the covering layer, respectively at the ratios shown in Tables 2 to 4, which was melt-kneaded. The respective melt-kneaded resins were introduced into the die for forming a multilayer strand and were joined in the die, which was extruded through a small hole of the die attached to the outlet side of the extruder as a strand formed into a two-layer structure (sheath-core structure). Then, the extruded strand was water-cooled, which was cut with a pelletizer so as to be a mean weight of almost 1 mg, followed by drying. Then, composite resin beads were obtained.

In this regard, zinc borate was supplied to the polyolefin resin for constituting the core layer as a cell adjusting agent with masterbatch so that the content of zinc borate should be 500 weight ppm. The antistatic agents shown in Tables 2 to 4 were blended with the polyolefin resin for constituting the covering layer at a predetermined amount so as to have the blending amount shown in Tables 2 to 4. When the antistatic agents were added to the core layer, the antistatic agents shown in Tables 2 to 4 were blended with the polyolefin resin for constituting the core layer at a predetermined amount so as to have the blending amount shown in Table. The resulting mixtures were supplied to respective extruders.

In addition, the content of the antistatic agent in the covering layer and/or core layer of the resin particles is equal to the blended amount of the antistatic agent to them.

[Preparation of Foamed Composite Resin Beads]

1 kg of the composite resin beads obtained above and 3 L of water (dispersion medium) were charged to a 5 L autoclave. 0.3 part by weight of kaolin as the dispersing agent, 0.004 part by weight of surfactant (sodium alkylbenzene sulfonate), and 0.01 part by weight of aluminum sulfate based on 100 parts by weight of composite resin beads were respectively added to the dispersion medium. The blowing agents shown in Tables 2 to 4 were injected into the autoclave so as to have the internal autoclave pressures shown in Tables 2 to 4. The resulting product was heated to a "foaming temperature", shown in Tables 2 to 4, with stirring, which was maintained at the same temperature for predetermined time and the calorific value of a high temperature endothermic peak was adjusted. Thereafter, the contents in the autoclave were released with water under atmospheric pressure to produce foamed resin beads.

The foamed resin beads having a high expansion ratio (low density foamed resin beads) of Example 18 were prepared by using the two-stage expanding method. In particular, foamed resin beads having an apparent density of 45 kg/m$^3$ were first produced and then the usual curing step at atmospheric pressure was carried out. Thereafter, the other autoclave was filled up with the foamed resin beads, which was subjected to a pressurizing step, followed by heating with steam. Then, composite foamed resin beads having an apparent density of 18 kg/m$^3$ were prepared.

[Preparation of Molded Foamed Article]

The foamed composite resin beads obtained in the above described manner were charged into a molding cavity (250 mm length×200 mm width×50 mm thickness), which was molded with steam at the molding pressures shown in Tables 2 to 4. In this regard, the steam pressure in which the molded foamed article was not greatly shrunk and showed the highest fusion rate was used as the molding pressure. When the pressure was higher than the molding pressure, the molded foamed article was greatly shrunk or the fusion rate was reduced. As a result, a good molded foamed article was not obtained. The pressure was discharged after the end of heating. The molded foamed article was water-cooled until the surface pressure which derives from the expanding force of the molded foamed article was reduced to 0.04 MPa (G). The mold was opened and the molded foamed article was taken out from the mold. The obtained molded foamed article was cured in an oven at 80° C. for 12 hours and a molded polypropylene resin foamed article was obtained. The physical properties of the molded foamed article thus obtained were shown in Tables 2 to 4.

Evaluation of physical properties of the foamed resin beads and the molded foamed article was performed in the following manner.

[Antistatic Properties]

As for the antistatic performance of the molded foamed article, the surface resistivity was measured and evaluated. After curing the molded foamed article under conditions of a temperature of 23° C. and a humidity of 50% RH for one day, the surface resistivity was measured by the above described method based on JIS K 6271 (2001). The surface resistivity of the "skin surface" in Table was a value obtained by cutting a specimen for measurement in a rectangular parallelepiped shape having a dimension of 100 mm length, 100 mm width and 50 mm thickness (thickness of the molded foamed article) from near the central portion of the molded foamed article and measuring the skin surface of the specimen. Alternatively, the surface resistivity of the "cut surface" was a value obtained by cutting a specimen for measurement in a rectangular parallelepiped shape having a dimension of 100 mm length, 100 mm width and 50 mm thickness (thickness of the molded foamed article), removing 10 mm of the skin surface in the thickness direction from one skin surface to form a specimen for measurement, and measuring the surface from which the skin surface of the specimen for measurement was removed. As the measuring apparatus, Hiresta MCP-HT450 (manufactured by Mitsubishi Chemical Corporation) was used.

[Fusion Bonding Properties]

As for the fusion bonding performance of the molded foamed article, the fusion bonding rate was measured and evaluated. The fusion bonding rate was determined by following method. The molded foamed article was bent and fractured. The number C1 of the foamed resin beads present on the fracture surface and the number C2 of the destroyed beads was determined. A material failure rate was calculated as a percentage of the destroyed beads (C2/C1×100). The above described measurement was performed 5 times using different specimens. Respective material failure rates were found and an arithmetic average value thereof was defined as a fusion rate.

[Mechanical Strength of Molded Foamed Resin Article]

50% compressive stress of the molded foamed article was measured and the mechanical strength of the molded foamed article was evaluated. A specimen was cut in a rectangular parallelepiped shape having a dimension of 100 mm length, 100 mm width and 25 mm thickness (there was no skin surface at the time of molding.) from the central portion of the molded foamed article. Then, a compression velocity relative to the specimen was 10 mm/min and the load at 50% strain was determined based on JIS K 6767 (1999). The obtained value was divided by a pressure received area of the specimen to determine 50% compressive stress (kPa).

[Shrink Properties of Foamed Resin Beads]

A compressed air was injected into a pressure-resistant vessel containing foamed resin beads so that the pressure in the vessel had a gage pressure of 0.2 MPa, which was stored at 30° C. for 24 hours. Thereafter, the pressure was released and the foamed resin beads were taken out from the vessel. The foamed resin beads taken out were left in a constant temperature and humidity bath at 23° C. and a relative humidity of 50% RH under an ordinary pressure for 24 hours. A ratio of the apparent density of foamed resin beads after pressurization to the apparent density of foamed resin beads before pressurization (apparent density after pressurization/apparent density before pressurization) was found, which was defined as a shrinkage ratio.

[Apparent Density of Foamed Resin Beads]

A group of the foamed resin beads (weight, W(g)) was immersed in a graduated cylinder containing water using a wire net. The volume V (L) of the group of the foamed resin beads was calculated from the scale of the rising portion of water level. The value (W/V) obtained by dividing the weight W of the group of the foamed resin beads by the volume V was converted to [kg/m$^3$].

[Apparent Density of Molded Foamed Article]

The value obtained by dividing the weight of the molded foamed article by the volume calculated from an outside dimension of the molded foamed article was converted to [kg/m$^3$].

[Average Cell Diameter of Foamed Resin Beads]

The average cell diameter of foamed resin beads was measured by the following method. A foamed bead was cut into nearly equal halves and cross-section was photographed using an electron microscope. On the photograph, four straight lines each passing the center of the cross-section were drown in a radial pattern.

A total N (piece) of the number of cells crossing the four straight lines was calculated. A total L of the length of each four straight line (μm) was calculated. The value obtained by dividing the total L of the straight lines by the total N of the number of cells was defined (L/N) as an average cell diameter of the foamed resin beads.

[Calorific Value of an Endothermic Peak]

DSC measurement of the foamed resin beads was performed by the above described method. The calorific value of the endothermic peak at a high temperature side (high temperature peak) of the foamed beads as well as the calorific value of the endothermic peak as to all of the foamed resin beads were determined. As the measuring apparatus, DSCQ1000 (manufactured by TA INSTRUMENTS) was used.

(1) Comparative example 1 shows foamed resin beads with an apparent density of 60 kg/cm$^3$ in which the foamed resin beads had a usual single layer structure, a resin 2 (zPP with a melting point of 142° C.) was used as the polyolefin resin constituting foamed resin beads (corresponding to the core layer of the sheath-core structure), and 10% by weight of PEEA was mixed as the antistatic agent. The molded foamed article produced from the foamed resin beads had poor fusion properties and the desired antistatic properties were not obtained, either.

(2) Comparative example 2 shows foamed resin beads in which the blending amount of the antistatic agent was increased to 15% by weight in the foamed resin beads of Comparative example 1. The foamed resin beads were significantly shrunk immediately after foaming and expanding. In the case of the molded foamed article produced by molding in a mold the foamed resin beads at a molding pressure of 0.34 MPa, the desired antistatic performance was obtained. However, fusion properties were significantly reduced. The molding pressure was set to 0.36 MPa in order to improve the fusion properties. However, the molded foamed article was significantly shrunk by excessive heating and a good molded foamed article was not given.

(3) Comparative example 3 shows foamed resin beads in which the polyolefin resin was changed to a resin 1 (mPP with a melting point of 142° C.) and the antistatic agent was changed from PEEA (polyether ester amid type) to PEO (polyolefin-polyethylene oxide block copolymer type) in the foamed resin beads of Comparative example 1. In the case of the molded foamed article obtained from the foamed resin beads, the desired antistatic performance was obtained, however, the fusion properties were still insufficient. As with Comparative example 2, the molded foamed article was significantly shrunk by excessive heating and a good molded foamed article could not be produced when the molding pressure was increased.

(4) Comparative example 4 shows composite foamed resin beads with an apparent density of 60 kg/cm$^3$ in which foamed resin beads had a sheath-core structure, the resin 1 (mPP with a melting point of 142° C.) was used as the resin of the core layer (R), the same resin as that of the core layer (R) was used as the resin of the covering layer (R), and the antistatic agent was added to the covering layer (R) and the core layer (R) in the same manner as described in Example 6. Even when the foamed resin beads had the sheath-core structure, there was no temperature difference between the melting point of the covering layer (R) and the melting point of the core layer (R). Thus, the molded article obtained from the foamed resin beads was inferior in fusion properties. As with Comparative example 2, the molded foamed article was significantly shrunk by excessive heating and a good molded foamed article could not be produced when the molding pressure was increased.

(5) Comparative example 5 shows the foamed particles produced in the same manner as described in Example 1 except that the blending amount of the antistatic agent for the covering layer (R) was set to 5% by weight. The blending amount of the antistatic agent for the covering layer (R) was too low and thus the desired antistatic performance in the molded article obtained from the foamed resin beads were not given.

(6) Comparative example 6 shows the foamed resin beads produced in the same manner as described in Example 1 except that the blending amount of the antistatic agent for the covering layer (R) was set to 50% by weight. The blending amount of the antistatic agent for the covering layer (R) was too high and thus the molded article obtained from the foamed resin beads was inferior in fusion properties. As with Comparative example 2, the molded foamed article was significantly shrunk by excessive heating and a good molded foamed article could not be produced when the molding pressure was increased.

(7) Comparative example 7 shows the foamed resin beads produced in the same manner as described in Example 6 except that the antistatic agent was added to the core layer (R) without adding the antistatic agent to the covering layer (R). Even when the antistatic agent was added to the core layer (R) of the foamed resin beads, the molded article obtained from the foamed resin beads could not construct a network of the antistatic agent because the antistatic agent was not added to the covering layer (R). As a result, the antistatic performance was inferior to that of the molded article obtained from the foamed resin beads of Comparative example 3 without the covering layer (E).

TABLE 2

| | | | | | Example 1 | Example 2 | Example 3 | Example 4 | Example 5 | Example 6 |
|---|---|---|---|---|---|---|---|---|---|---|
| Manufacturing conditions | Resin beads structure | | | — | Sheath-core | Sheath-core | Sheath-core | Sheath-core | Sheath-core | Sheath-core |
| | Covering layer | Polyolefin resin | kinds | — | Resin A | Resin A | Resin A | Resin A | Resin A | Resin A |
| | | | Melting point | °C. | 125 | 125 | 125 | 125 | 125 | 125 |
| | | Antistatic agent | kinds | — | PEO | PEO | PEO | PEO | PEO | PEO |
| | | | Blending amount | % by weight | 15 | 20 | 30 | 40 | 15 | 15 |
| | | Ratio | | % by weight | 5 | 5 | 5 | 5 | 5 | 5 |
| | Core layer | Polyolefin resin | kinds | — | Resin 1 | Resin 1 | Resin 1 | Resin 1 | Resin 1 | Resin 1 |
| | | | Melting point | °C. | 142 | 142 | 142 | 142 | 142 | 142 |
| | | Antistatic agent | kinds | — | — | — | — | — | PEO | PEO |
| | | | Blending amount | % by weight | 0 | 0 | 0 | 0 | 5 | 10 |
| | | Ratio | | % by weight | 95 | 95 | 95 | 95 | 95 | 95 |
| | Melting point difference (core layer-covering layer) | | | °C. | 17 | 17 | 17 | 17 | 17 | 17 |
| | Blowing agent | | kinds | — | $CO_2$ | $CO_2$ | $CO_2$ | $CO_2$ | $CO_2$ | $CO_2$ |
| | | | Internal pressure | MPa (G) | 2.65 | 2.65 | 2.65 | 2.65 | 2.45 | 2.25 |
| | Foaming temperature | | | °C. | 145.5 | 145.5 | 145.5 | 145.5 | 145.5 | 145.5 |
| Physical properties of foamed resin beads | Apparent density | | | kg/m³ | 60 | 60 | 60 | 60 | 60 | 63 |
| | Average cell diameter | | | μm | 150 | 150 | 150 | 150 | 200 | 250 |
| | Shrinking ratio | | | — | 1.00 | 1.00 | 1.00 | 1.00 | 1.00 | 0.96 |
| | Calorific value of a high temperature peak | | | J/g | 16 | 16 | 16 | 16 | 15 | 15 |
| | Calorific value as to all of the foamed resin beads | | | J/g | 80 | 79 | 79 | 79 | 77 | 70 |
| Manufacturing conditions | Molding pressure | | | MPa (G) | 0.28 | 0.28 | 0.28 | 0.32 | 0.28 | 0.26 |
| Physical properties of molded foamed article | Apparent density | | | kg/m³ | 67 | 67 | 67 | 67 | 67 | 67 |
| | Fusion rate | | | % | 100 | 100 | 100 | 80 | 100 | 100 |
| | Surface resistivity | | Skin surface | Ω | $4.5 \times 10^{13}$ | $4.6 \times 10^{12}$ | $1.9 \times 10^{12}$ | $1.2 \times 10^{12}$ | $3.0 \times 10^{13}$ | $1.0 \times 10^{12}$ |
| | | | Cut surface | Ω | $5.5 \times 10^{13}$ | $9.4 \times 10^{12}$ | $3.0 \times 10^{12}$ | $2.0 \times 10^{12}$ | $1.6 \times 10^{13}$ | $2.9 \times 10^{12}$ |
| | 50% compressive stress | | | kPa | 640 | 640 | 640 | 640 | 620 | 600 |

| | | | | | Example 7 | Example 8 | Example 9 | Example 10 |
|---|---|---|---|---|---|---|---|---|
| Manufacturing conditions | Resin beads structure | | | — | Sheath-core | Sheath-core | Sheath-core | Sheath-core |
| | Covering layer | Polyolefin resin | kinds | — | Resin A | Resin A | Resin B | Resin C |
| | | | Melting point | °C. | 125 | 125 | 135 | 100 |
| | | Antistatic agent | kinds | — | PEO | PEO | PEO | PEO |
| | | | Blending amount | % by weight | 15 | 20 | 30 | 30 |
| | | Ratio | | % by weight | 5 | 5 | 5 | 5 |
| | Core layer | Polyolefin resin | kinds | — | Resin 1 | Resin 1 | Resin 1 | Resin 1 |
| | | | Melting point | °C. | 142 | 142 | 142 | 142 |
| | | Antistatic agent | kinds | — | PEO | PEO | — | — |
| | | | Blending amount | % by weight | 15 | 7.5 | 0 | 0 |
| | | Ratio | | % by weight | 95 | 95 | 95 | 95 |
| | Melting point difference (core layer-covering layer) | | | °C. | 17 | 17 | 7 | 42 |
| | Blowing agent | | kinds | — | $CO_2$ | $CO_2$ | $CO_2$ | $CO_2$ |
| | | | Internal pressure | MPa (G) | 2.05 | 2.35 | 2.65 | 2.65 |
| | Foaming temperature | | | °C. | 145.5 | 145.5 | 145.5 | 145.5 |
| Physical properties of foamed resin beads | Apparent density | | | kg/m³ | 67 | 60 | 60 | 60 |
| | Average cell diameter | | | μm | 400 | 200 | 150 | 150 |
| | Shrinking ratio | | | — | 0.89 | 1.00 | 1.00 | 1.00 |
| | Calorific value of a high temperature peak | | | J/g | 14 | 15 | 16 | 16 |
| | Calorific value as to all of the foamed resin beads | | | J/g | 67 | 75 | 82 | 78 |
| Manufacturing conditions | Molding pressure | | | MPa (G) | 0.26 | 0.26 | 0.32 | 0.28 |
| Physical properties of molded foamed article | Apparent density | | | kg/m³ | 67 | 67 | 67 | 67 |
| | Fusion rate | | | % | 100 | 100 | 80 | 100 |
| | Surface resistivity | | Skin surface | Ω | $7.8 \times 10^{10}$ | $2.7 \times 10^{12}$ | $2.0 \times 10^{12}$ | $1.5 \times 10^{12}$ |
| | | | Cut surface | Ω | $6.8 \times 10^{10}$ | $3.5 \times 10^{12}$ | $3.0 \times 10^{12}$ | $2.6 \times 10^{12}$ |
| | 50% compressive stress | | | kPa | 570 | 610 | 640 | 640 |

TABLE 3

| | | | | Example 11 | Example 12 | Example 13 | Example 14 | Example 15 | Example 16 |
|---|---|---|---|---|---|---|---|---|---|
| Manufacturing conditions | Resin beads structure | | — | Sheath-core | Sheath-core | Sheath-core | Sheath-core | Sheath-core | Sheath-core |
| | Covering layer | Polyolefin resin | kinds | Resin A | Resin A | Resin A | Resin A | Resin A | Resin A |
| | | | Melting point °C. | 125 | 125 | 125 | 125 | 125 | 125 |
| | | Antistatic agent | kinds | PEO | PEO | PEEA | PEO | PEO | PEO |
| | | | Blending amount % by weight | 30 | 30 | 30 | 30 | 30 | 15 |
| | | Ratio | % by weight | 5 | 5 | 5 | 5 | 5 | 15 |
| | Core layer | Polyolefin resin | kinds | Resin 2 | Resin 3 | Resin 1 | Resin 1 | Resin 1 | Resin 1 |
| | | | Melting point °C. | 142 | 155 | 142 | 142 | 142 | 142 |
| | | Antistatic agent | kinds | — | — | — | — | — | — |
| | | | Blending amount % by weight | 0 | 0 | 0 | 0 | 0 | 0 |
| | | Ratio | % by weight | 95 | 95 | 95 | 95 | 95 | 85 |
| | Melting point difference (core layer-covering layer) | | °C. | 17 | 30 | 17 | 17 | 17 | 17 |
| | Blowing agent | kinds | — | $CO_2$ | $CO_2$ | $CO_2$ | $CO_2$ | $CO_2$ | $CO_2$ |
| | | Internal pressure | MPa (G) | 2.60 | 2.15 | 2.65 | 2.85 | 3.40 | 2.80 |
| | Foaming temperature | | °C. | 152.0 | 161.0 | 145.5 | 145.0 | 144.5 | 145.5 |
| Physical properties of foamed resin beads | Apparent density | | kg/m³ | 60 | 60 | 60 | 40 | 32 | 60 |
| | Average cell diameter | | μm | 190 | 200 | 350 | 250 | 310 | 210 |
| | Shrinking ratio | | — | 1.00 | 1.00 | 1.00 | 1.00 | 1.00 | 1.00 |
| | Calorific value of a high temperature peak | | J/g | 15 | 19 | 16 | 16 | 15 | 14 |
| | Calorific value as to all of the foamed resin beads | | J/g | 75 | 88 | 79 | 79 | 79 | 67 |
| Manufacturing conditions | Molding pressure | | MPa (G) | 0.32 | 0.40 | 0.32 | 0.26 | 0.24 | 0.28 |
| Physical properties of molded foamed article | Apparent density | | kg/m³ | 67 | 67 | 67 | 44 | 36 | 67 |
| | Fusion rate | | % | 100 | 100 | 100 | 90 | 100 | 100 |
| | Surface resistivity | Skin surface | Ω | $1.5 \times 10^{12}$ | $2.6 \times 10^{12}$ | $8.9 \times 10^{12}$ | $9.9 \times 10^{11}$ | $8.7 \times 10^{11}$ | $8.7 \times 10^{12}$ |
| | | Cut surface | Ω | $5.0 \times 10^{12}$ | $4.7 \times 10^{12}$ | $9.1 \times 10^{12}$ | $2.8 \times 10^{12}$ | $9.9 \times 10^{11}$ | $1.2 \times 10^{13}$ |
| | 50% compressive stress | | kPa | 540 | 700 | 630 | 380 | 300 | 510 |

| | | | | Example 17 | Example 18 | Example 19 | Example 20 | Example 21 |
|---|---|---|---|---|---|---|---|---|
| Manufacturing conditions | Resin beads structure | | — | Sheath-core | Sheath-core | Sheath-core | Sheath-core | Sheath-core |
| | Covering layer | Polyolefin resin | kinds | Resin A | Resin A | Amorphous PP | Resin C | Resin A |
| | | | Melting point °C. | 125 | 125 | (64)* | 100 | 125 |
| | | Antistatic agent | kinds | PEO | PEO | PEO | PEO | PEO |
| | | | Blending amount % by weight | 15 | 15 | 30 | 30 | 30 |
| | | Ratio | % by weight | 5 | 5 | 5 | 5 | 1 |
| | Core layer | Polyolefin resin | kinds | Resin 1 | Resin 1 | Resin 1 | Resin 4 | Resin 2 |
| | | | Melting point °C. | 142 | 142 | 142 | 142 | 142 |
| | | Antistatic agent | kinds | PEO | — | — | — | — |
| | | | Blending amount % by weight | 10 | 0 | 0 | 0 | 0 |
| | | Ratio | % by weight | 95 | 95 | 95 | 95 | 99 |
| | Melting point difference (core layer-covering layer) | | °C. | 17 | 17 | (78)** | 62 | 17 |
| | Blowing agent | kinds | — | air | $CO_2$ | $CO_2$ | $CO_2$ | $CO_2$ |
| | | Internal pressure | MPa (G) | 3.00 | 3.05 | 2.65 | 2.20 | 2.55 |
| | Foaming temperature | | °C. | 147.5 | 145.5 | 145.5 | 170.0 | 152.0 |
| Physical properties of foamed resin beads | Apparent density | | kg/m³ | 66 | 18 | 60 | 60 | 60 |
| | Average cell diameter | | μm | 110 | 400 | 150 | 200 | 190 |
| | Shrinking ratio | | — | 0.91 | 1.00 | 1.00 | 1.00 | 1.00 |
| | Calorific value of a high temperature peak | | J/g | 16 | 15 | 16 | 30 | 15 |
| | Calorific value as to all of the foamed resin beads | | J/g | 70 | 80 | 75 | 99 | 76 |
| Manufacturing conditions | Molding pressure | | MPa (G) | 0.28 | 0.22 | 0.28 | 0.50 | 0.34 |
| Physical properties of molded foamed article | Apparent density | | kg/m³ | 67 | 20 | 67 | 67 | 67 |
| | Fusion rate | | % | 100 | 100 | 100 | 100 | 80 |
| | Surface resistivity | Skin surface | Ω | $3.6 \times 10^{12}$ | $6.2 \times 10^{11}$ | $3.0 \times 10^{12}$ | $1.0 \times 10^{12}$ | $1.4 \times 10^{13}$ |
| | | Cut surface | Ω | $6.6 \times 10^{13}$ | $4.4 \times 10^{11}$ | $4.9 \times 10^{12}$ | $2.0 \times 10^{12}$ | $8.9 \times 10^{13}$ |
| | 50% compressive stress | | kPa | 580 | 180 | 640 | 720 | 555 |

*A value in parenthesis located at an intersection of a column of the melting point and a row of Example 19 is a softening point.
**A value in parenthesis located at an intersection of a column of the melting point difference and a row of Example 19 is the difference between the melting point of the core layer and the softening point of the covering layer.

TABLE 4

|  |  |  |  |  | Comparative example 1 | Comparative example 2 | Comparative example 3 | Comparative example 4 |
|---|---|---|---|---|---|---|---|---|
| Manufacturing conditions | Resin beads structure |  |  | — | Single-layer | Single-layer | Single-layer | Sheath-core |
|  | Covering layer | Polyolefin resin | kinds | — | — | — | — | Resin 1 |
|  |  |  | Melting point | °C. | — | — | — | 142 |
|  |  | Antistatic agent | kinds | — | — | — | — | PEO |
|  |  |  | Blending amount | % by weight | — | — | — | 15 |
|  |  | Ratio |  | % by weight | — | — | — | 5 |
|  | Core layer | Polyolefin resin | kinds | — | Resin 2 | Resin 2 | Resin 1 | Resin 1 |
|  |  |  | Melting point | °C. | 142 | 142 | 142 | 142 |
|  |  | Antistatic agent | kinds | — | PEEA | PEEA | PEO | PEO |
|  |  |  | Blending amount | % by weight | 10 | 15 | 10 | 10 |
|  |  | Ratio |  | % by weight | 100 | 100 | 100 | 95 |
|  | Melting point difference (core layer-covering layer) |  |  | °C. | — | — | — | 0 |
|  | Blowing agent |  | kinds | — | $CO_2$ | $CO_2$ | $CO_2$ | $CO_2$ |
|  |  |  | Internal pressure | MPa (G) | 2.10 | 1.90 | 2.15 | 2.65 |
|  | Foaming temperature |  |  | °C. | 152.0 | 152.0 | 145.5 | 145.5 |
| Physical properties of foamed resin beads | Apparent density |  |  | kg/m³ | 65 | 76 | 63 | 60 |
|  | Average bubble diameter |  |  | μm | 400 | 550 | 240 | 250 |
|  | Shrinking ratio |  |  | — | 0.92 | 0.79 | 0.96 | 1.00 |
|  | Calorific value of a high temperature peak |  |  | J/g | 15 | 14 | 15 | 15 |
|  | Calorific value as to all of the foamed resin beads |  |  | J/g | 63 | 69 | 62 | 67 |
| Manufacturing conditions | Molding pressure |  |  | MPa (G) | 0.34 | 0.34   0.36 | 0.30   0.32 | 0.32   0.34 |
| Physical properties of molded foamed article | Apparent density |  |  | kg/m³ | 67 | 67   — | 67   — | 67   — |
|  | Fusion rate |  |  | % | 50 | 30   — | 70   — | 60   — |
|  | Surface resistivity |  | Skin surface | Ω | $4.4 \times 10^{14}$ | $5.2 \times 10^{12}$   — | $1.8 \times 10^{13}$   — | $2.5 \times 10^{12}$   — |
|  |  |  | Cut surface | Ω | $8.2 \times 10^{14}$ | $7.9 \times 10^{12}$   — | $2.2 \times 10^{13}$   — | $2.0 \times 10^{12}$   — |
|  | 50% compressive stress |  |  | kPa | 510 | 480 | 560 | 600 |

|  |  |  |  |  | Comparative example 5 | Comparative example 6 | Comparative example 7 |
|---|---|---|---|---|---|---|---|
| Manufacturing conditions | Resin beads structure |  |  | — | Sheath-core | Sheath-core | Sheath-core |
|  | Covering layer | Polyolefin resin | kinds | — | Resin A | Resin A | Resin A |
|  |  |  | Melting point | °C. | 125 | 125 | 125 |
|  |  | Antistatic agent | kinds | — | PEO | PEO | — |
|  |  |  | Blending amount | % by weight | 5 | 50 | 0 |
|  |  | Ratio |  | % by weight | 5 | 5 | 5 |
|  | Core layer | Polyolefin resin | kinds | — | Resin 1 | Resin 1 | Resin 1 |
|  |  |  | Melting point | °C. | 142 | 142 | 142 |
|  |  | Antistatic agent | kinds | — | — | — | PEO |
|  |  |  | Blending amount | % by weight | 0 | 0 | 10 |
|  |  | Ratio |  | % by weight | 95 | 95 | 95 |
|  | Melting point difference (core layer-covering layer) |  |  | °C. | 17 | 17 | 17 |
|  | Blowing agent |  | kinds | — | $CO_2$ | $CO_2$ | $CO_2$ |
|  |  |  | Internal pressure | MPa (G) | 2.65 | 2.65 | 2.25 |
|  | Foaming temperature |  |  | °C. | 145.5 | 145.5 | 145.5 |
| Physical properties of foamed resin beads | Apparent density |  |  | kg/m³ | 60 | 63 | 63 |
|  | Average bubble diameter |  |  | μm | 150 | 150 | 250 |
|  | Shrinking ratio |  |  | — | 1.00 | 0.95 | 0.95 |
|  | Calorific value of a high temperature peak |  |  | J/g | 16 | 16 | 15 |
|  | Calorific value as to all of the foamed resin beads |  |  | J/g | 80 | 79 | 71 |
| Manufacturing conditions | Molding pressure |  |  | MPa (G) | 0.28 | 0.32   0.34 | 0.26 |
| Physical properties of molded foamed article | Apparent density |  |  | kg/m³ | 67 | 67   — | 67 |
|  | Fusion rate |  |  | % | 100 | 50   — | 100 |
|  | Surface resistivity |  | Skin surface | Ω | $8.7 \times 10^{14}$ | $1.0 \times 10^{12}$   — | $1.8 \times 10^{14}$ |
|  |  |  | Cut surface | Ω | $5.4 \times 10^{15}$ | $1.5 \times 10^{12}$   — | $1.6 \times 10^{14}$ |
|  | 50% compressive stress |  |  | kPa | 640 | 640 | 590 |

Remark: The symbol "—" in a column of the physical properties of molded foamed article means not evaluated because the molded foamed article was significantly shrunk and a good foamed molded article was not given.

What is claimed is:

1. A method for producing foamed polyolefin resin beads having antistatic properties, the method comprising:
dispersing polyolefin resin beads into an aqueous medium in an autoclave;
injecting a blowing agent, pressurizing the autoclave, and impregnating the polyolefin resin beads with the blowing agent;
stirring under heating; and
releasing the aqueous medium and contents of the autoclave into a low-pressure area with an internal constant pressure sufficient to allow the polyolefin resin beads to foam and expand, wherein the polyolefin resin beads are composite resin beads comprising a core layer of a core layer polyolefin resin and a covering layer of a covering layer polyolefin resin, obtained by cutting a strand comprising the core layer and the covering layer laminated on a surface of the core layer by co-extruding the polyolefin resin for forming the core layer and the polyolefin resin for forming the covering layer,
(a) the core layer polyolefin resin is a crystalline polyolefin resin having a melting point (A),
(b) the covering layer polyolefin resin is a crystalline polyolefin resin which has a lower melting point (B) than the melting point (A) of the core layer polyolefin resin, and a temperature difference [(A)−(B)] between the melting point (B) and the melting point (A) is within the range of 0° C.<[(A)−(B)]≦80° C., or
the covering layer polyolefin resin is a noncrystalline polyolefin resin which has a softening point (C) lower than the melting point (A) of the core layer polyolefin resin, and a temperature difference [(A)−(C)] between the softening point (C) and the melting point (A) is within the range of 0° C.<[(A)−(C)]≦100° C., and
(c) the covering layer comprises a polymer antistatic agent in an amount (D) within the range of 10%≦D<50% by total weight of the covering layer.

2. The method according to claim 1, wherein the covering layer polyolefin resin is a crystalline polyolefin resin which has a lower melting point (B) than a melting point (A) of the core layer polyolefin resin, and a temperature difference [(A)−(B)] between the melting point (A) and the melting point (B) is in the range of 1 to 80° C., or
the covering layer polyolefin resin is a noncrystalline polyolefin resin which has a lower softening point (C) than a melting point (A) of the core layer polyolefin resin, and a temperature difference [(A)−(C)] between the melting point (A) and the softening point (C) is in the range of 1 to 100° C.

3. The method according to claim 1, wherein the covering layer polyolefin resin is a crystalline polyolefin resin which has a lower melting point (B) than a melting point (A) of the core layer polyolefin resin, and a temperature difference [(A)−(B)] between the melting point (A) and the melting point (B) is in the range of 5 to 60° C., or
the covering layer polyolefin resin is a noncrystalline polyolefin resin which has a lower softening point (C) than a melting point (A) of the core layer polyolefin resin, and a temperature difference [(A)−(C)] between the melting point (A) and the softening point (C) is in the range of 5 to 60° C.

4. The method according to claim 1, wherein the core layer contains the polymer antistatic agent in an amount of 0 to 3% by weight of the polymer antistatic agent based on the total weight of the core layer.

5. The method according to claim 1, wherein 5 to 15% by weight of polymer antistatic agent based on total weight of the core layer is contained in the core layer.

6. The method according to claim 1, wherein the crystalline polyolefin resin of the core layer is a polypropylene resin.

7. The method according to claim 6, wherein the covering layer noncrystalline polyolefin resin is a polypropylene resin.

8. The method according to claim 1, wherein a weight ratio of the core layer to the covering layer is in the range of 99.5:0.5 to 80:20.

9. The method according to claim 1, wherein the weight ratio of the core layer to the covering layer is in the range of 98:2 to 80:20.

10. The method according to claim 1, wherein the weight ratio of the core layer to the covering layer is in the range of 96:4 to 90:10.

11. The method according to claim 1, wherein the covering layer polyolefin resin is a polyolefin resin polymerized with a metallocene polymerization catalyst.

12. The method according to claim 1, wherein a ratio (X/Y) of an apparent density (X) of foamed beads after pressurizing with compressed air under conditions of 30° C. and 0.2 MPa (G) for 24 hours and leaving under an ordinary pressure at 23° C. for 24 hours to an apparent density (Y) of foamed beads before the pressurization is in the range of 0.8 to 1.0.

13. The method according to claim 1, wherein the covering layer is substantially solid.

14. The method according to claim 1, wherein the polymer antistatic agent has a number average molecular weight of 2000 to 100000.

* * * * *